(12) United States Patent
Yamashita

(10) Patent No.: US 11,616,833 B2
(45) Date of Patent: Mar. 28, 2023

(54) INFORMATION PROCESSING APPARATUS AND NON-TRANSITORY COMPUTER READABLE MEDIUM STORING PROGRAM FOR SERVICE INVITATION

(71) Applicant: FUJIFILM Business Innovation Corp., Tokyo (JP)

(72) Inventor: Akio Yamashita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 410 days.

(21) Appl. No.: 16/352,861

(22) Filed: Mar. 14, 2019

(65) Prior Publication Data
US 2019/0373055 A1    Dec. 5, 2019

(30) Foreign Application Priority Data
May 31, 2018   (JP) .............................. JP2018-105222

(51) Int. Cl.
*H04L 67/50* (2022.01)
*H04L 67/104* (2022.01)
*H04L 9/40* (2022.01)
*H04W 12/64* (2021.01)
*G06Q 30/0282* (2023.01)
(Continued)

(52) U.S. Cl.
CPC ..... *H04L 67/1051* (2013.01); *G06Q 30/0282* (2013.01); *G06Q 30/0631* (2013.01); *H04L 63/10* (2013.01); *H04L 67/1046* (2013.01); *H04L 67/535* (2022.05); *H04W 12/64* (2021.01); *H04L 67/30* (2013.01)

(58) Field of Classification Search
CPC ............. H04L 67/30–306; H04L 67/12; H04L 67/1051; H04L 67/1046; H04L 67/535; H04L 63/10; G06Q 10/10; G06Q 30/02–0282; G06Q 50/01; G06Q 30/0631; G06F 3/12–1298; G06K 3/00; G03G 2215/00–2096; H04W 12/64
See application file for complete search history.

(56) References Cited

U.S. PATENT DOCUMENTS 7,340,501 B2 * 3/2008 Miida ................. G06F 11/3013
                                                                  711/212
8,763,145 B2   6/2014 Mihara
(Continued)

FOREIGN PATENT DOCUMENTS

JP    2002202826    7/2002
JP    2009134332    6/2009
(Continued)

OTHER PUBLICATIONS

"Office Action of Japan Counterpart Application", dated Sep. 6, 2022, with English translation thereof, p. 1-p. 6.
(Continued)

*Primary Examiner* — Mohamed A. Wasel
(74) *Attorney, Agent, or Firm* — JCIPRNET

(57) ABSTRACT

An information processing apparatus includes an extracting unit that extracts, based on attribute information of an object necessary for using a service provided by a service system and information related to a user of the service system, a candidate for the user to be invited to the service, out of users who are yet to use the service.

8 Claims, 17 Drawing Sheets

(51) Int. Cl.
*G06Q 30/0601* (2023.01)
*H04L 67/30* (2022.01)

(56) References Cited

U.S. PATENT DOCUMENTS

| | | | | |
|---|---|---|---|---|
| 8,942,992 B1* | 1/2015 | Zhu | G06Q 20/387 | 705/14.1 |
| 9,363,221 B1* | 6/2016 | Ozog | H04L 67/306 | |
| 10,693,998 B1* | 6/2020 | Gu | H04L 43/0876 | |
| 11,157,929 B1* | 10/2021 | Eby | H04W 64/00 | |
| 2002/0083165 A1* | 6/2002 | Nagata | G06Q 30/02 | 709/223 |
| 2002/0126701 A1* | 9/2002 | Requena | H04L 51/04 | 370/469 |
| 2003/0086106 A1* | 5/2003 | Parry | G06K 15/00 | 358/1.13 |
| 2003/0088528 A1* | 5/2003 | Parry | G03G 15/5075 | 706/1 |
| 2004/0249703 A1* | 12/2004 | Weiszfeiler | G06Q 30/0235 | 705/14.35 |
| 2006/0075019 A1* | 4/2006 | Donovan | G06F 16/9535 | 707/E17.109 |
| 2008/0172696 A1* | 7/2008 | Furusawa | H04N 21/4532 | 707/E17.109 |
| 2008/0256201 A1* | 10/2008 | Flowers | H04L 51/14 | 709/206 |
| 2009/0248476 A1* | 10/2009 | Trinh | G06Q 10/107 | 705/7.19 |
| 2009/0276436 A1* | 11/2009 | Otranen | G06F 16/27 | |
| 2010/0161377 A1* | 6/2010 | Hines | G06Q 30/0201 | 705/7.29 |
| 2010/0174560 A1* | 7/2010 | Quan | H04L 12/1881 | 705/3 |
| 2010/0305982 A1* | 12/2010 | Hulse | G06Q 30/06 | 705/16 |
| 2011/0107088 A1* | 5/2011 | Eng | H04L 9/0631 | 713/155 |
| 2011/0142221 A1* | 6/2011 | Tofighbakhsh | H04M 1/2749 | 379/202.01 |
| 2011/0258039 A1* | 10/2011 | Patwa | G06Q 30/0242 | 705/14.45 |
| 2012/0143690 A1* | 6/2012 | Hansen | G06Q 30/0207 | 705/14.58 |
| 2012/0191776 A1* | 7/2012 | Ruffner | H04L 67/535 | 709/204 |
| 2012/0290950 A1* | 11/2012 | Rapaport | H04N 21/8358 | 715/753 |
| 2013/0085968 A1* | 4/2013 | Schultz | G06F 3/1292 | 358/1.14 |
| 2013/0097053 A1* | 4/2013 | Lee | G06Q 30/0282 | 705/26.7 |
| 2013/0110949 A1* | 5/2013 | Maurel | G06Q 30/02 | 709/206 |
| 2013/0173387 A1* | 7/2013 | Adelaar | G06Q 30/02 | 705/14.58 |
| 2013/0227162 A1* | 8/2013 | Kuosa | H04L 67/322 | 709/233 |
| 2013/0262238 A1* | 10/2013 | Liubachev | G06Q 30/0269 | 705/14.66 |
| 2013/0304898 A1* | 11/2013 | Aggarwal | H04W 4/21 | 709/224 |
| 2013/0324097 A1* | 12/2013 | Roberts | H04L 67/34 | 455/418 |
| 2013/0339397 A1* | 12/2013 | Herasymchuk | G06F 16/435 | 707/803 |
| 2014/0067596 A1* | 3/2014 | McGovern | G06Q 30/0246 | 705/26.7 |
| 2014/0074959 A1* | 3/2014 | Alsina | H04N 21/458 | 709/213 |
| 2014/0089400 A1* | 3/2014 | Yan | H04L 67/306 | 709/204 |
| 2014/0164394 A1* | 6/2014 | Maru | G06Q 30/0251 | 707/748 |
| 2014/0214946 A1* | 7/2014 | van de Bruggen | H04L 51/32 | 709/204 |
| 2014/0215086 A1* | 7/2014 | Pitschel | H04L 67/26 | 709/231 |
| 2014/0215584 A1* | 7/2014 | Webb | G06F 21/42 | 726/6 |
| 2014/0269630 A1* | 9/2014 | Kakadia | H04W 72/0446 | 370/336 |
| 2014/0287779 A1* | 9/2014 | O'Keefe | H04L 67/52 | 455/456.3 |
| 2014/0317026 A1* | 10/2014 | Kim | G06Q 50/01 | 706/11 |
| 2014/0365312 A1* | 12/2014 | Clement | G06Q 30/0269 | 705/14.66 |
| 2015/0127489 A1* | 5/2015 | Vasthimal | G06Q 30/0625 | 705/26.62 |
| 2015/0186133 A1* | 7/2015 | Yarra | G06F 8/65 | 717/121 |
| 2015/0213504 A1* | 7/2015 | Katz | G06Q 30/0267 | 705/14.64 |
| 2015/0227975 A1* | 8/2015 | Momin | G06Q 30/0207 | 705/14.1 |
| 2015/0229600 A1* | 8/2015 | Huang | G06F 16/951 | 709/206 |
| 2015/0242895 A1* | 8/2015 | Brown | G06Q 30/0267 | 705/14.55 |
| 2015/0254726 A1* | 9/2015 | Cassidy | G06Q 50/12 | 705/14.58 |
| 2015/0328547 A1* | 11/2015 | Uriu | A63F 13/48 | 463/42 |
| 2015/0378646 A1* | 12/2015 | James | G06F 3/126 | 358/1.15 |
| 2015/0379582 A1* | 12/2015 | Jain | G06Q 50/01 | 705/14.66 |
| 2016/0005003 A1* | 1/2016 | Norris | H04L 65/403 | 705/7.19 |
| 2016/0011554 A1* | 1/2016 | Shipman | G06Q 20/145 | 399/81 |
| 2016/0149843 A1* | 5/2016 | Spicer | H04L 51/32 | 709/206 |
| 2016/0173930 A1* | 6/2016 | Jin | H04N 21/4334 | 725/40 |
| 2016/0210578 A1* | 7/2016 | Raleigh | G06Q 20/102 | |
| 2016/0217397 A1* | 7/2016 | Peters | G06Q 10/02 | |
| 2017/0017971 A1* | 1/2017 | Moreau | G06Q 30/0255 | |
| 2017/0046749 A1* | 2/2017 | Kolluri | G06Q 30/0267 | |
| 2017/0094332 A1* | 3/2017 | Thomas | H04N 21/4532 | |
| 2017/0094361 A1* | 3/2017 | Thomas | H04N 21/2543 | |
| 2017/0126641 A1* | 5/2017 | Thomas | H04L 65/612 | |
| 2017/0127104 A1* | 5/2017 | Thomas | H04N 21/44204 | |
| 2017/0161273 A1* | 6/2017 | Cao | G06F 16/2455 | |
| 2017/0206529 A1* | 7/2017 | Raleigh | G06Q 20/0855 | |
| 2017/0220933 A1* | 8/2017 | Gonguet | G06Q 10/101 | |
| 2017/0228785 A1* | 8/2017 | Evje | G06Q 30/0275 | |
| 2017/0236182 A1* | 8/2017 | Ignatyev | G06Q 30/0631 | 705/26.7 |
| 2017/0368683 A1* | 12/2017 | Qiu | H04L 67/535 | |
| 2018/0020505 A1* | 1/2018 | Deros | F21V 33/0048 | |
| 2018/0082321 A1* | 3/2018 | Boccardi | G06Q 30/0226 | |
| 2018/0110093 A1* | 4/2018 | Deros | H04W 4/021 | |
| 2018/0114250 A1* | 4/2018 | Phillips | A63F 13/212 | |
| 2018/0131831 A1* | 5/2018 | Tolia | H04N 1/00042 | |
| 2018/0189835 A1* | 7/2018 | DeLuca | G06Q 30/0246 | |
| 2018/0210964 A1* | 7/2018 | Esmailzadeh | G06F 16/9558 | |
| 2018/0300751 A1* | 10/2018 | Hammitt | G06N 3/08 | |
| 2018/0315088 A1* | 11/2018 | Bijor | G06Q 30/0261 | |
| 2018/0374164 A1* | 12/2018 | Ozog | G06Q 30/0246 | |
| 2019/0228434 A1* | 7/2019 | Hara | G06Q 30/0255 | |
| 2019/0253831 A1* | 8/2019 | Wang | G01S 5/0263 | |
| 2019/0273839 A1* | 9/2019 | Shiotani | H04N 1/00482 | |
| 2019/0304007 A1* | 10/2019 | Parisis | H04W 4/029 | |
| 2019/0342942 A1* | 11/2019 | Deros | H04W 4/70 | |
| 2020/0045519 A1* | 2/2020 | Raleigh | G06Q 30/02 | |

(56) References Cited

U.S. PATENT DOCUMENTS

2020/0204643 A1\* 6/2020 Zhou ................. H04M 1/72448
2020/0280758 A1\* 9/2020 O'Rourkes ........ H04N 21/8549

FOREIGN PATENT DOCUMENTS

| JP | 2011258112 | 12/2011 |
| JP | 2012256248 | 12/2012 |
| JP | 2016146914 | 8/2016 |

OTHER PUBLICATIONS

"Office Action of Japan Counterpart Application" with English translation thereof, dated Feb. 15, 2022, p. 1-p. 8.

\* cited by examiner

FIG. 2

TENANT INFORMATION

| TENANT | TENANT NAME | SERVICE | DEVICE | USER |
|---|---|---|---|---|
| tnnnt-001 | TENANT001 | svc001, svc002, svc003 | dev-300110, dev-110038 | |
| tnnnt-002 | TENANT002 | | | |
| tnnnt-003 | TENANT003 | | | |

FIG. 3

SERVICE INFORMATION

| SERVICE ID | SERVICE NAME | OUTLINE DESCRIPTION | DEVICE | FUNCTION OF DEVICE TO BE USED | INVITATION MESSAGE |
|---|---|---|---|---|---|
| svr-001 | svc001 | ... | dev-300110 | SCANNING | |
| svr-002 | svc002 | ... | dev-110038 | SCANNING AND PRINTING | |
| svr-003 | svc003 | ... | dev-300110, dev-110038 | SCANNING AND PRINTING | |
| | | | | | |

FIG. 4

DEVICE INFORMATION

| DEVICE ID | POSITION | MOUNTING TYPE | FUNCTION (SCANNING) HISTORY | FUNCTION (PRINTING) HISTORY | AVAILABLE SERVICE |
|---|---|---|---|---|---|
| dev-300110 | pos-00000010 | STATIONARY | his-scn-0000001 | his-ptr-0000003 | svr-001 |
| dev-110021 | pos-00000020 | MOBILE | null | - | - |
| dev-110038 | pos-00000030 | STATIONARY | his-scn-0000002 | his-ptr-0000004 | svr-001, svr-002, svr-003 |
| dev-110067 | pos-00000040 | STATIONARY | null | his-ptr-0000005 | |

FIG. 5

USAGE HISTORY INFORMATION

| HISTORY ID | LOG FILE NAME |
|---|---|
| his-scn-0000001 | dev-300110-scn.log |
| his-scn-0000002 | dev-110038-scn.log |
| his-ptr-0000003 | dev-300110-ptr.log |
| his-ptr-0000004 | dev-110038-ptr.log |
| his-ptr-0000005 | dev-110067-ptr.log |

FIG. 6

USER INFORMATION

| USER ID | USER NAME | PASSWORD | MAIL ADDRESS | ORGANIZATION OF AFFILIATION | POSITION | TENANT OF AFFILIATION | AVAILABLE SERVICE |
|---|---|---|---|---|---|---|---|
| uid-0000133 | kanazawa | ***** | Kanazawaxxxx@ | ORGANIZATION002 | pos-00001330 | tnnnt-001 | |
| uid-0000876 | tanaka | ***** | Tanakaxxxx@ | ORGANIZATION004 | pos-00008760 | tnnnt-001 | |
| uid-0001563 | chiba | ***** | Chibaxxxx@ | ORGANIZATION004 | pos-00015630 | tnnnt-001 | |
| uid-0092432 | akita | ***** | Akitaxxxx@ | ORGANIZATION003 | pos-00924320 | tnnnt-001 | |
| uid-0098597 | matsuyama | ***** | Matsuyamaxxxx@ | ORGANIZATION010 | pos-00985970 | tnnnt-001 | |
| uid-0100364 | miyagi | ***** | Miyagixxxx@ | ORGANIZATION010 | pos-01003640 | tnnnt-001 | |
| uid-0012345 | suzuki | ***** | Suzukixxxx@ | ORGANIZATION010 | pos-00123450 | tnnnt-001 | |
| uid-0052432 | hiroshima | ***** | Hiroshimaxxxx@ | ORGANIZATION010 | pos-00524320 | tnnnt-001 | |
| uid-0052432 | yamada | ***** | Yamadaxxxx@ | ORGANIZATION010 | pos-00524320 | tnnnt-001 | |

FIG. 7

POSITION INFORMATION

| POSITION ID | ADDRESS | BUILDING NAME | FLOOR | COORDINATE INFORMATION (LONGITUDE AND LATITUDE INFORMATION) |
|---|---|---|---|---|
| pos-00000010 | x-y-z, DISTRICT X, CITY X, KANAGAWA PREFECTURE | OFFICE XX | 19SE1-1 | |
| pos-00000020 | | | | |
| pos-00000030 | x-y-z, DISTRICT X, CITY X, KANAGAWA PREFECTURE | OFFICE XX | 19NE2-1 | |
| pos-00000040 | x-y-z, DISTRICT X, CITY X, KANAGAWA PREFECTURE | OFFICE XX | 18NE2-4 | |
| pos-00001330 | x-y-z, DISTRICT X, CITY X, KANAGAWA PREFECTURE | OFFICE XX | 19SE1-1 | |
| pos-00008760 | x-y-z, DISTRICT X, CITY X, KANAGAWA PREFECTURE | OFFICE XX | 19SE1-2 | |
| pos-00015630 | x-y-z, DISTRICT X, CITY X, KANAGAWA PREFECTURE | OFFICE XX | 19SE1-2 | |
| pos-00924320 | x-y-z, DISTRICT X, CITY X, KANAGAWA PREFECTURE | OFFICE XX | 19NE2-3 | |
| pos-00985970 | x-y-z, DISTRICT X, CITY X, KANAGAWA PREFECTURE | OFFICE XX | 19NE2-5 | |
| pos-01003640 | x-y-z, DISTRICT X, CITY X, KANAGAWA PREFECTURE | OFFICE XX | 19NE2-4 | |

FIG. 12A

SERVICE USER COLLECTIVE SETTING

| SERVICE | ATTRIBUTE | |
|---|---|---|
| NO DESIGNATION ▼ | UNUSED ▼ | EXTRACTION |

FIG. 12B

SERVICE USER COLLECTIVE SETTING

| SERVICE | ATTRIBUTE | |
|---|---|---|
| svc001 ▼ | POSITION ▼ | EXTRACTION |

SERVICE USER COLLECTIVE SETTING

| SERVICE | ATTRIBUTE | |
|---|---|---|
| svc001 ▼ | POSITION ▼ | EXTRACTION |

DOWNLOAD EXTRACTION RESULTS

FIG. 12D

SERVICE USER COLLECTIVE SETTING

| SERVICE | ATTRIBUTE | |
|---|---|---|
| svc001 ▼ | POSITION ▼ | EXTRACTION |

DOWNLOAD EXTRACTION RESULTS

UPLOAD FILE | users-setting_201802270950.csv | REFERENCE | DELETE

EXECUTE COLLECTIVE SETTING

| ATTRIBUTE | EVALUATION EXPRESSION | EVALUATION RESULT |
|---|---|---|
| POSITION | DISTANCE EVALUATION (pos1 AND pos2) | SEND BACK RESULT OF DISTANCE MEASUREMENT OF pos1 AND pos2 BY 10m |
| FUNCTION | FUNCTION EVALUATION (DEVICE ID, FUNCTION, USER ID, AND PERIOD) | ACQUIRE NUMBER OF APPEARANCE OF USER ID IN PERIOD DESIGNATED IN LOG FILE DETERMINED BY DEVICE ID AND FUNCTION AND SEND BACK ACQUIRED RESULT |

FIG. 14

EXTRACTION CONDITION

| ATTRIBUTE OF EXTRACTION CONDITION | VALUE OF EXTRACTION CONDITION |
|---|---|
| SERVICE NAME | svc001 |
| DEVICE ATTRIBUTE | POSITION |

EXTRACTION RESULTS (INVITATION INFORMATION)

| SERVICE NAME | OPERATION | USER NAME | MAIL ADDRESS | NEAREST DEVICE | DEVICE POSITION | DISTANCE BETWEEN USER AND DEVICE (BY 10m) |
|---|---|---|---|---|---|---|
| svc001 | INVITATION | kanazawa | Kanazawaxxxx@ | Dev1 | 19SE1-1 | 10 |
| svc001 | INVITATION | tanaka | Tanakaxxxx@ | Dev1 | 19SE1-1 | 20 |
| svc001 | INVITATION | chiba | Chibaxxxx@ | Dev1 | 19SE1-1 | 20 |
| svc001 | INVITATION | suzuki | Suzukixxxx@ | Dev2 | 19NE2-1 | 30 |
| svc001 | INVITATION | hiroshima | Hiroshimaxxxx@ | Dev2 | 19NE2-1 | 50 |
| svc001 | INVITATION | yamada | Yamadaxxxx@ | Dev2 | 19NE2-1 | 40 |

FIG. 15

EXTRACTION CONDITION

| ATTRIBUTE OF EXTRACTION CONDITION | VALUE OF EXTRACTION CONDITION |
|---|---|
| SERVICE NAME | svc002 |
| DEVICE ATTRIBUTE | FUNCTION |

EXTRACTION RESULTS (INVITATION INFORMATION)

| SERVICE NAME | OPERATION | USER NAME | MAIL ADDRESS | NEAREST DEVICE | DEVICE POSITION | SCANNING FREQUENCY | NUMBER OF PRINTED SHEETS |
|---|---|---|---|---|---|---|---|
| svc002 | INVITATION | kanazawa | Kanazawaxxxx@ | Dev1 | 19SE1-1 | 543 | 181 |
| svc002 | INVITATION | chiba | Chibaxxxx@ | Dev1 | 19SE1-1 | 333 | 111 |
| svc002 | INVITATION | suzuki | Suzukixxxx@ | Dev2 | 19NE2-1 | 241 | 80 |
| svc002 | | hiroshima | Hiroshimaxxxx@ | Dev2 | 19NE2-1 | 60 | 180 |
| svc002 | | yamada | Yamadaxxxx@ | Dev2 | 19NE2-1 | 36 | 108 |
| svc002 | | tanaka | Tanakaxxxx@ | Dev1 | 19SE1-1 | 0 | 23 |

FIG. 16

EXTRACTION CONDITION

| ATTRIBUTE OF EXTRACTION CONDITION | VALUE OF EXTRACTION CONDITION |
|---|---|
| SERVICE NAME | NO DESIGNATION |
| DEVICE ATTRIBUTE | UNUSED |

EXTRACTION RESULTS (INVITATION INFORMATION)

| SERVICE NAME | OPERATION | USER NAME | MAIL ADDRESS | DEVICE | DISTANCE TO DEVICE (BY 10m) |
|---|---|---|---|---|---|
| svc001 | INVITATION | chiba | Chibaxxxx@ | Dev1 | 20 |
| svc002 | INVITATION | tanaka | Tanakaxxxx@ | Dev1 | 20 |
| svc002 | INVITATION | hiroshima | Hiroshimaxxxx@ | Dev2 | 50 |
| svc002 | INVITATION | yamada | Yamadaxxxx@ | Dev2 | 40 |

FIG. 17

USER INFORMATION

| USER ID | USER NAME | PASSWORD | MAIL ADDRESS | ORGANIZATION OF AFFILIATION | POSITION | TENANT OF AFFILIATION | AVAILABLE SERVICE |
|---|---|---|---|---|---|---|---|
| uid-0000133 | kanazawa | ***** | Kanazawaxxxx@ | ORGANIZATION002 | pos-00001330 | tnnnt-001 | svc001, svc002 |
| uid-0000876 | tanaka | ***** | Tanakaxxxx@ | ORGANIZATION004 | pos-00008760 | tnnnt-001 | svc001 |
| uid-0001563 | chiba | ***** | Chibaxxxx@ | ORGANIZATION004 | pos-00015630 | tnnnt-001 | svc002 |
| uid-0092432 | akita | ***** | Akitaxxxx@ | ORGANIZATION003 | pos-00924320 | tnnnt-001 | |
| uid-0098597 | matsuyama | ***** | Matsuyamaxxxx@ | ORGANIZATION010 | pos-00985970 | tnnnt-001 | |
| uid-01100364 | miyagi | ***** | Miyagixxxx@ | ORGANIZATION010 | pos-01003640 | tnnnt-001 | |
| uid-0012345 | suzuki | ***** | Suzukixxxx@ | ORGANIZATION010 | pos-00123450 | tnnnt-001 | svc002 |
| uid-0052432 | hiroshima | ***** | Hiroshimaxxxx@ | ORGANIZATION010 | pos-00524320 | tnnnt-001 | |
| uid-0052432 | yamada | ***** | Yamadaxxxx@ | ORGANIZATION010 | pos-00524320 | tnnnt-001 | |

INFORMATION PROCESSING APPARATUS AND NON-TRANSITORY COMPUTER READABLE MEDIUM STORING PROGRAM FOR SERVICE INVITATION

CROSS-REFERENCE TO RELATED APPLICATIONS

This application is based on and claims priority under 35 USC 119 from Japanese Patent Application No. 2018-105222 filed May 31, 2018.

BACKGROUND

(i) Technical Field

The present invention relates to an information processing apparatus and a non-transitory computer readable medium storing a program, particularly to extraction of a user intended to be invited for using a service provided by a service system.

(ii) Related Art

In a case where a contract is carried out on an organization basis such as an office, a service provider provides a service, in which a device such as a multi-function printer mounted on an office is used in accordance with the contract, that is, a service in a customized form to the organization in some cases. In this case, a staff member or the like enrolled in the office becomes a user of a service system but the user performs user registration for each service to be used, out of services provided by the service provider. That is, the service becomes available to the user by performing the user registration.

A manager of the office wants a user to use an appropriate service from a perspective of improving work efficiency or the like. For this reason, the manager has invited a user, who has not performed the user registration for a service recommended to use, to the service by sending an invitation message for promoting the user registration for the service.

JP2011-258112A and JP2012-256248A are examples of the related art.

SUMMARY

However, in the related art, a manager has subjectively selected and invited a user under a situation where an indicator for selecting a user intended to be invited for using a service is not presented.

Aspects of non-limiting embodiments of the present disclosure relate to a service system that provides users with services and extracts a user intended to be invited for using a service, out of users who are yet to use the service, based on a relationship between an object to be used in providing the service and the user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including an extracting unit that extracts, based on attribute information of an object necessary for using a service provided by a service system and information related to a user of the service system, a candidate for the user to be invited to the service, out of users who are yet to use the service.

BRIEF DESCRIPTION OF THE DRAWINGS

Exemplary embodiment (s) of the present invention will be described in detail based on the following figures, wherein:

FIG. 2 is a table showing a data configuration example of tenant information stored in a tenant information memory unit of the exemplary embodiment;

FIG. 3 is a table showing a data configuration example of service information stored in a service information memory unit of the exemplary embodiment;

FIG. 4 is a table showing a data configuration example of device information stored in a device information memory unit of the exemplary embodiment;

FIG. 5 is a table showing a data configuration example of usage history information stored in a usage history information memory unit of the exemplary embodiment;

FIG. 6 is a table showing a data configuration example of user information stored in a user information memory unit of the exemplary embodiment;

FIG. 7 is a table showing a data configuration example of position information stored in a position information memory unit of the exemplary embodiment;

FIGS. 12A to 12D are views illustrating a display example of a service user collective setting screen displayed on the manager terminal of the exemplary embodiment;

FIG. 13 is a table showing an evaluation expression used in the exemplary embodiment;

FIG. 14 is a table showing an example of a data configuration of invitation information generated in the exemplary embodiment;

FIG. 15 is a table showing another example of the data configuration of the invitation information generated in the exemplary embodiment;

FIG. 16 is a table showing still another example of the data configuration of the invitation information generated in the exemplary embodiment; and FIG. 17 is a table showing a data setting example of the user information after a user is invited for using a service in the exemplary embodiment.

DETAILED DESCRIPTION

Hereinafter, an exemplary embodiment of the present invention will be described based on the drawings.

Figure 1:
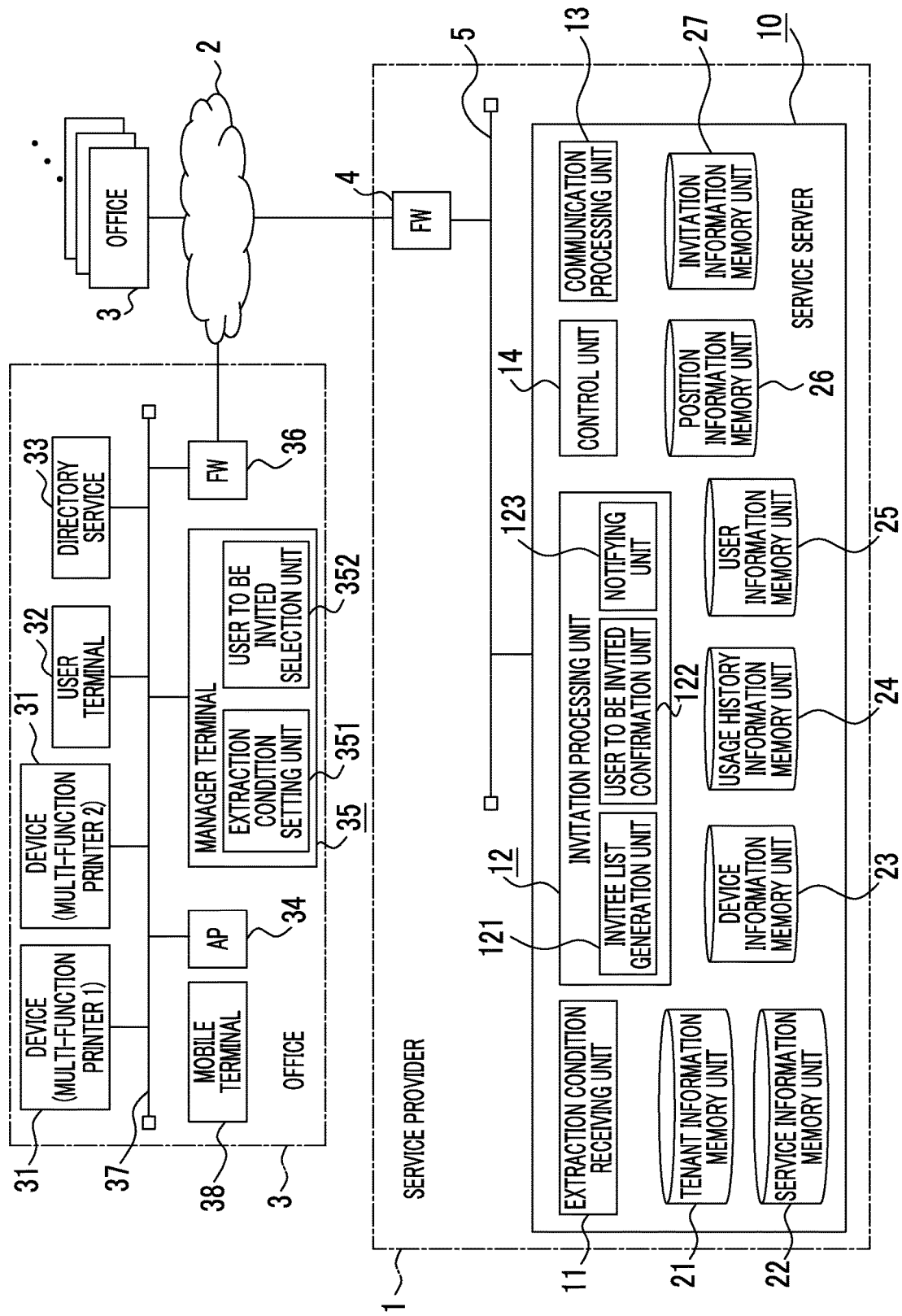
FIG. 1 is an overall configuration diagram of a network system according to the exemplary embodiment.

FIG. 1 is an overall configuration diagram of a network system according to the exemplary embodiment. FIG. 1 shows a configuration where a service system of a service provider 1 and an in-house system of an office 3 are connected to each other via the Internet 2. The office 3 uses services provided by the service provider 1 under contract.

The service provider 1 provides a plurality of services with the use of objects in the office 3 by signing a contract on an organization basis such as the office 3. A cloud service is used as a service in some cases. The "objects" in the exemplary embodiment refer to objects that can be used in providing services. Although physically existing devices such as a multi-function printer and a mobile device are basically assumed as the objects, the objects may be software such as applications. Description will be given under an assumption that a multi-function printer (device) having a plurality of functions such as a printing function and a scanning function is the object in the exemplary embodiment.

As described above, the service provider 1 in the exemplary embodiment carries out a service contract on an organization basis, or in the exemplary embodiment, on the office 3 basis, and manages a client (the office 3) on a service contract basis. The management unit will be referred to as a "tenant" in the exemplary embodiment. It can be said that a tenant is under a virtual environment formed in the service system which is associated with the office 3 one on one and provides the office 3 with services.

It is necessary for a staff member or the like who is enrolled in the office 3 (user) to perform user registration for each service to be used in order to use services provided by the service system.

The service system of the service provider 1 has a configuration where a service server 10 and a firewall (FW) 4 are connected to a LAN 5, and is connected to the Internet 2 via the firewall 4.

The service server 10 is a server computer (information processing apparatus) that forms the core of the service system. A hardware configuration can be basically realized by a computer which has existed from the past. That is, the service server 10 has a CPU, a memory device, such as a ROM, a RAM, and a hard disk drive (HDD), and a network interface that connects the LAN 5 to the Internet 2. The service server may be connected to input means such as a mouse and a keyboard, and display means such as a display as appropriate.

As shown in FIG. 1, the service server 10 has an extraction condition receiving unit 11, an invitation processing unit 12, a communication processing unit 13, a control unit 14, a tenant information memory unit 21, a service information memory unit 22, a device information memory unit 23, a usage history information memory unit 24, a user information memory unit 25, a position information memory unit 26, and an invitation information memory unit 27. Configuration elements which are not described in the exemplary embodiment are not illustrated in the drawings.

The extraction condition receiving unit 11 receives extraction conditions, which are transmitted from the office 3 and are designated by a manager in order to extract a user intended to be invited for using a service. The invitation processing unit 12 performs a process for promoting use of a service by extracting a user intended to be invited for using the service and transmitting an invitation message to the extracted user. The invitation processing unit 12 has an invitee list generation unit 121, a user to be invited confirmation unit 122, and a notifying unit 123. The invitee list generation unit 121 generates an invitation list by extracting candidates of a user to be invited to the service, out of users who are yet to use the service, based on attribute information of an object necessary for using a service provided by the service system (attribute information of a multi-function printer 31 in a case of the exemplary embodiment) and information related to a user of the service system. The user to be invited confirmation unit 122 causes the manager to select a user, as an invitation target, from users extracted by the invitee list generation unit 121 by making an enquiry to the manager. The notifying unit 123 invites a user (invitee) who is confirmed and selected by the manager to use a service by transmitting an invitation message.

The communication processing unit 13 communicates with the in-house system of the office 3 or the like via the Internet 2. The control unit 14 controls execution of a user extraction process to be described later in cooperation with the respective configuration elements 11 to 13.

FIG. 2 is a table showing a data configuration example of tenant information stored in the tenant information memory unit 21 of the exemplary embodiment. The tenant information includes tenant related information for each tenant corresponding to the office 3 with which the service provider 1 has signed a contract. Respective items such as a tenant, a tenant name, a service, a device, and a user are set in the tenant information. Identification information for identifying a tenant (tenant ID) is set in the tenant, and the name of a tenant is set in the tenant name. Identification information of one or a plurality of services to be provided to a tenant (service ID) is set in the service. Identification information of one or a plurality of devices to be used in a case of providing the service (device ID) is set in the device. Identification information of a user in the tenant (user ID) is set in the user. A user set in the item of user can use any services set in the item of service.

FIG. 3 is a table showing a data configuration example of service information stored in the service information memory unit 22 of the exemplary embodiment. The service information includes information related to services provided to the office 3. Respective items such as a service name, an outline description, a device, a function of a device to be used, and an invitation message, are set in the service information so as to correspond to a service ID. The name of the service is set in the service name and statements for describing the outline of the service is set in the outline description. Identification information of one or a plurality of devices to be used in a case of providing the service (device ID) is set in the device, and one or a plurality of functions to be used in a case of providing the service, out of functions of the device, are set in the function of a device to be used. An invitation message to be sent to a user to be invited for using a service is set in the invitation message. A tenant and a service to be provided to a user in the tenant are associated with a service ID.

FIG. 4 is a table showing a data configuration example of device information stored in the device information memory unit 23 of the exemplary embodiment. The device information includes information related to a device to be used in a case of providing a service. Respective items such as a position, a mounting type, a function (scanning) history, a function (printing) history, and an available service, are set in the device information so as to correspond to a device ID. Identification information indicating a mounting position of the device (position ID) is set in the position. A mounting method of the device is set in the mounting type. A setting example in which the device can be mounted and fixed (stationary) and be movable (mobile) is described in the exemplary embodiment. In a case where a function of a device is used, a usage history is recorded onto a log file corresponding to the used function in the exemplary embodiment. That is, a log file is provided for each function and for each device. Identification information of usage history information corresponding to a log file on which a usage history is recorded when a scanning function of the device is used (history ID) is set in the function (scanning) history. Similarly, a history ID of usage history information corresponding to a log file, on which a usage history is recorded when a printing function of the device is used, is set in the function (printing) history. An example in which history IDs corresponding to the two functions including the scanning function and the printing function are set in the device information is described in FIG. 4. However, for example, in a case where other functions that can be provided by the device, such as a FAX function, are used, a history ID of usage history information corresponding to the function is set. A service ID of an available service of the device is set in the available service. A service and a device used in the service are associated with a device ID.

FIG. 5 is a table showing a data configuration example of usage history information stored in the usage history information memory unit 24 of the exemplary embodiment. As described above, although a log file is provided for each function and for each device, usage history information is set such that a history ID of the usage history information is associated with a log file name. Since it is assumed that a log file is saved in a predetermined folder in the exemplary embodiment, information for specifying a place for storing is omitted.

FIG. 6 is a table showing a data configuration example of user information stored in the user information memory unit 25 of the exemplary embodiment. The user information is information related to a user, who is located at the office 3 and uses a service, and is information on each user registered in the item of user in the tenant information. Respective items such as a user name, a password, a mail address, an organization of affiliation, a position, a tenant of affiliation, and an available service, are set in the user information so as to correspond to a user ID. A name of the user is set in the user name. The user name also serves as an account ID when logging into the system. A password necessary in a case of logging into the system is set in the password. A mail address to be used by the user, that is, information for specifying a forwarding destination of an invitation message is set in the mail address in the exemplary embodiment. Identification information of an organization with which the user (organization ID) is affiliated is set in the organization of affiliation, and identification information indicating a position where the organization is located (position ID) is set in the position. A tenant ID of a tenant with which the user is affiliated is set in the tenant of affiliation. A service ID of a service which has become available by completing user registration is set in the available service.

FIG. 7 is a table showing a data configuration example of position information stored in the position information memory unit 26 of the exemplary embodiment. The position information is position related information indicating a mounting position of a device and a position where an organization of affiliation of a user is located. Respective items such as an address, a building name, a floor, and coordinate information, are set in the position information so as to correspond to a position ID. The address of the position is set in the address. A name is set in the building name as identification information of a building at the position. Although it is sufficient that a certain floor (number of floors) of the position is set in the floor, information further indicating which floor and which place the position is located at is set in the floor in the exemplary embodiment. For example, from the floor "19SE1-1" of the position "pos-00000010", it is possible to learn that the position is located at a room with the number "1-1" positioned southeast on the 19th floor. Coordinates showing the position are set in the coordinate information. The coordinate information is represented by longitude and latitude information in the exemplary embodiment. In the position information, an address, a building, a floor, a room on the floor, longitude and latitude information, undetailed information (broad information) indicating the position with an address, and detailed information (pinpoint information) indicating the position with coordinate information are indicated.

Since invitation information set in the invitation information memory unit 27 is information generated by the service system extracting a user to be invited for using a service according to a request from the manager, the invitation information will be described along with description of an operation.

The respective configuration elements 11 to 14 of the service server 10 are realized by a cooperative operation between a computer forming the service server 10 and a program operated on a CPU mounted on the computer. In addition, the respective memory units 21 to 27 are realized by an HDD mounted on the service server 10. Alternatively, a RAM or external storage means may be used via a network.

The system of the office 3 has a configuration where a device 31, a user terminal 32, a directory service 33, an access point (AP) 34, a manager terminal 35, and a firewall (FW) 36 are connected to a LAN 37, and is connected to the Internet 2 via the firewall 36.

Although the device 31 is assumed as a multi-function printer having a scanning function, a printing function, and the like, which is a device to be used in a case of providing services, in the exemplary embodiment, it is not necessary to limit the device thereto. In addition, although two devices 31 are shown in FIG. 1, the number of devices 31 to be mounted in the office 3 is not limited thereto. The user terminal 32 is a terminal device used by a user in the office 3, and is used in a case of using services. In addition, the manager terminal 35 is a terminal device used by the manager of the office 3. The respective terminal devices are realized by a general-purpose computer such as a PC. The directory service 33 manages also a user who is not registered in a tenant, and is used in a case of inviting a user who is unregistered in a tenant. The access point 34 wirelessly communicates with a mobile terminal 38 carried by a user, and is connected to the LAN 37.

The manager terminal 35 has an extraction condition setting unit 351 and a user to be invited selection unit 352. The extraction condition setting unit 351 sets extraction conditions of a user intended to be invited for using a service in response to an operation by the manager. The user to be invited selection unit 352 causes the manager to select a user to be actually invited to use a service from an invitation list generated by the service system. The extraction condition setting unit 351 and the user to be invited selection unit 352 are realized by a cooperative operation between a computer forming the manager terminal 35 and a program operated on a CPU mounted on the computer.

A program used in the exemplary embodiment can be provided not only by communication means but also can be provided by being stored in a computer readable recording medium, such as a CD-ROM and a USB memory. A program provided from the communication means or the recording medium is installed in a computer, and a CPU of the computer sequentially executes the program. Consequently, a variety of processes are realized.

The manager of the office 3 wants a user to effectively use services provided to a tenant from a perspective of improving work efficiency. Although registering all users for all services has been considered, such registration is not possible in consideration of charging based on the number of licenses, restriction, or the like. There is no problem in a case where a user registers oneself to use a service. However, in a case where a user does not use a service that would have been effective in work or the like, the manager wants the user to use the service.

Therefore, in the exemplary embodiment, in a case where user extraction conditions are designated by the manager, a user that satisfies the extraction conditions designated by the manager, that is, a user intended to be invited for using a certain service, out of a plurality of services provided to a tenant, can be extracted from users who are yet to use the service, based on a relationship between an object to be used in providing a service and a user, in order to assist the manager in user invitation.

Hereinafter, a process of extracting a user who satisfies extraction conditions designated by the manager as a user, who is a target of invitation for using a service, will be described in the exemplary embodiment with reference to flow charts shown in FIGS. 8 to 11.

Figure 8:
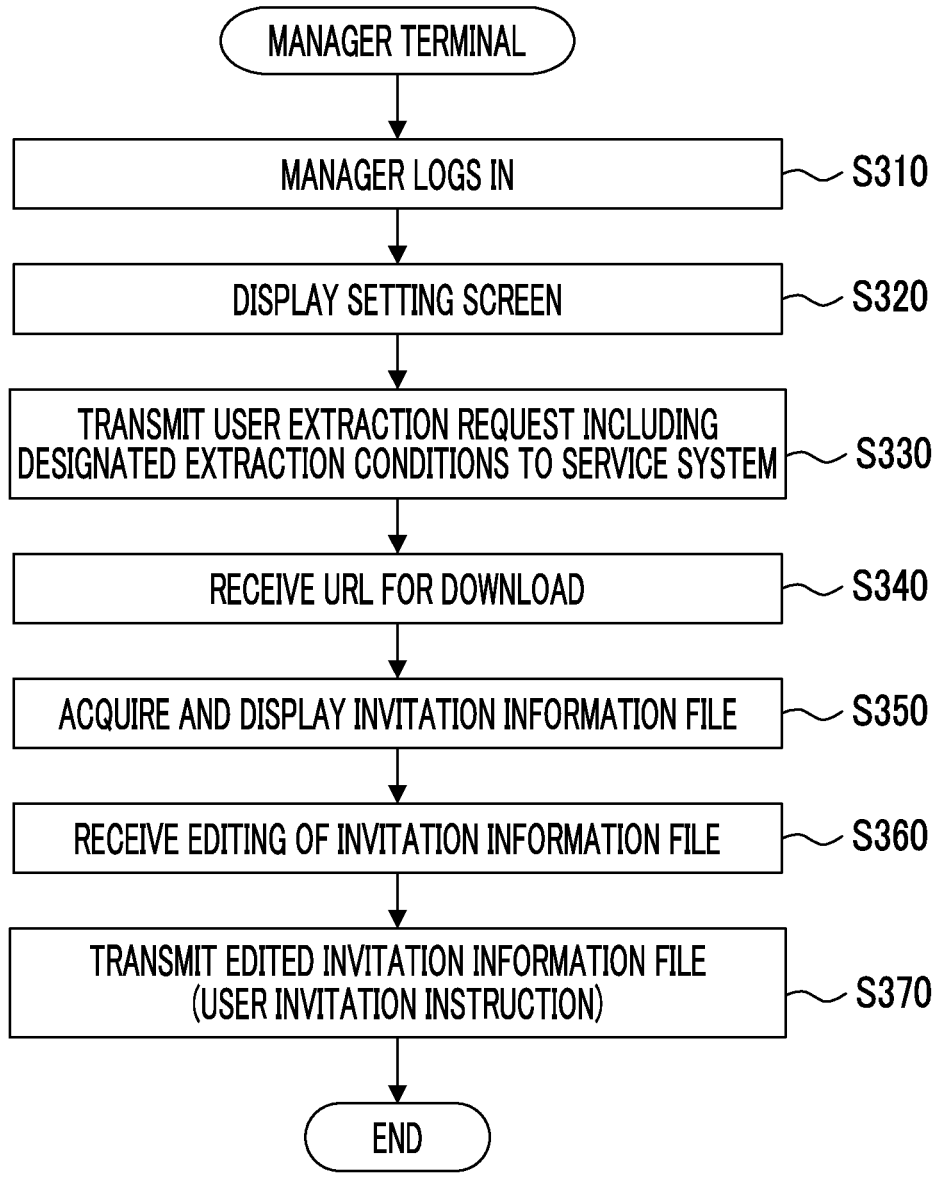
FIG. 8 is a flow chart showing a process carried out by a manager terminal out of user extraction processes of the exemplary embodiment.
Figure 9:
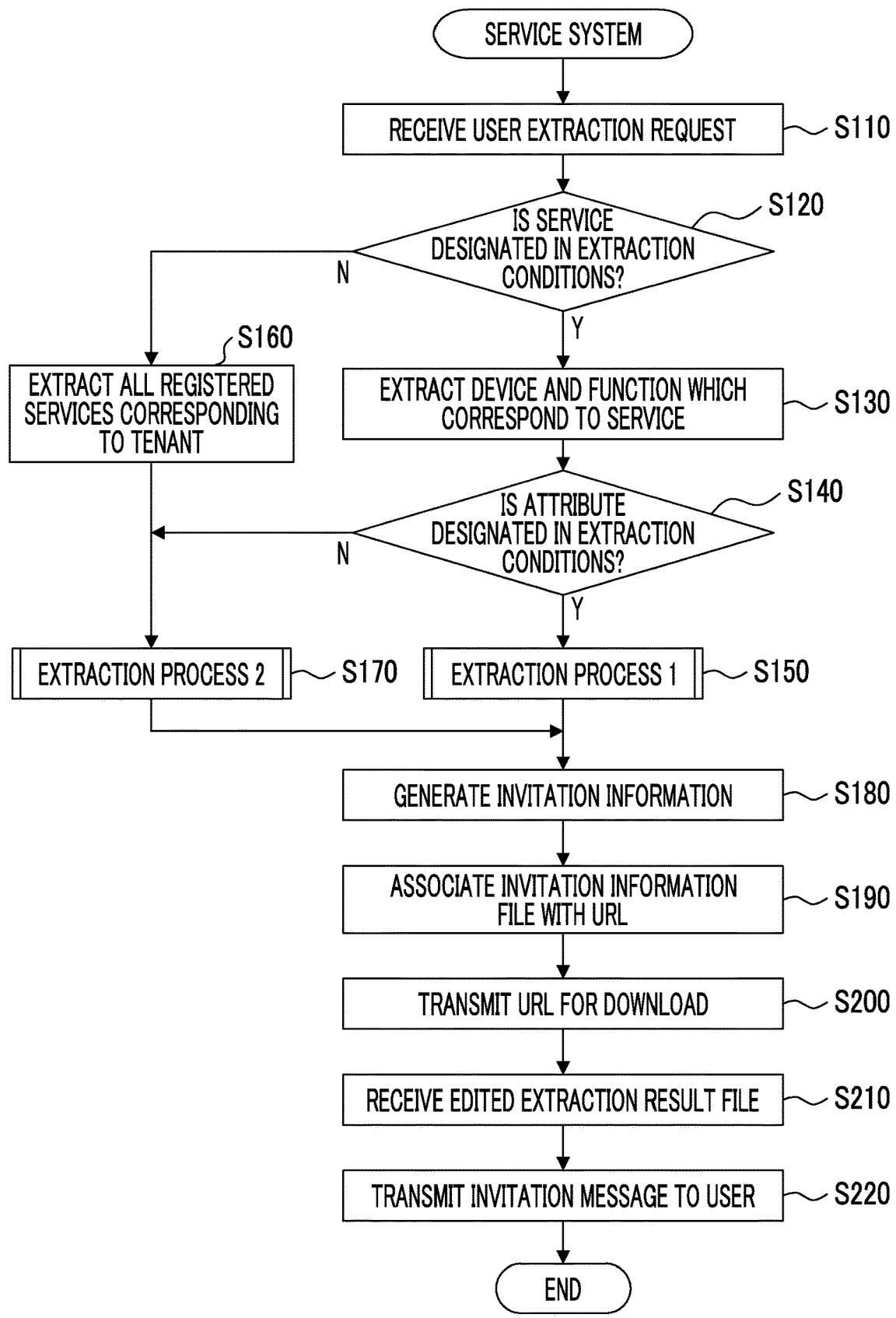
FIG. 9 is a flow chart showing a process carried out by a service system out of the user extraction processes of the exemplary embodiment.

A process to extract a user to be invited for using a service is carried out by cooperation between the manager terminal 35 used by the manager and the service system. Among the flow charts, FIG. 8 is a flow chart carried out by the manager terminal 35, and FIG. 9 is a flow chart carried out by the service system.

First, the manager logs into the service system from the manager terminal 35 (Step S310). The service system performs user authentication based on user information, but herein, description will be continued under an assumption that authentication has succeeded.

In a case where the manager has succeeded in logging in, the extraction condition setting unit 351 is activated automatically or in response to an operation by the manager. In a case where the extraction condition setting unit 351 is activated, the extraction condition setting unit displays a tenant management screen as an initial screen. The extraction condition setting unit 351 causes the manager terminal 35 to display the management screen in cooperation with the service system. The manager selects a service user collective setting screen for user invitation (hereinafter, simply referred to as a "setting screen") from the management screen. The extraction condition setting unit 351 displays the setting screen in response to this selection operation (Step S320). FIG. 12A illustrates a display example of the initial screen, which is the setting screen displayed in response to the operation by the manager.

The manager can set a service and an attribute as extraction conditions on the setting screen. The service includes services provided to a tenant, and a desired service can be selected from the services. According to a setting example of the tenant information shown in FIG. 2, the manager can select "svc001", "svc002", and "svc003" in a case where a tenant corresponding to the office 3 is "tnnnt-001". The manager can also select "no designation", which indicates that a service is not designated. The attribute includes attributes of a device. In the exemplary embodiment, a "position" and a "function" can be selected as an attribute. It is evident that a configuration where other attributes can be selected may be adopted. The manager can also select "unused", which indicates that a function is not specified. FIG. 12A illustrates an example in which "no designation" is displayed in the service as an initial value, and "unused" is displayed in the attribute as an initial value.

FIG. 12B illustrates a display example in a case where the manager has selected "svc001" as a service and "position" as an attribute. The manager instructs user extraction by selecting an extraction button 41 after setting extraction conditions in such a manner. The extraction condition setting unit 351 transmits a user extraction request including the extraction conditions to the service system in accordance with the instruction (Step S330).

The extraction condition receiving unit 11 in the service system stands by at all times for a user extraction request to be transmitted from the office 3. In a case where the extraction condition receiving unit 11 receives a user extraction request (Step S110), the invitation processing unit 12 executes the following process in accordance with the content of setting of the extraction conditions included in the user extraction request.

First, in a case where a specific service is designated in the service of the extraction conditions instead of no designation (Y in Step S120), the invitee list generation unit 121 extracts a device corresponding to the service and a function of the device with reference to the service information shown in FIG. 3 (Step S130). In a case where "svc001" is set in the service of the extraction conditions, "dev-300110" and "scanning" are extracted according to the setting example of the service information shown in FIG. 3.

Next, in a case where a specific attribute is set in the attribute of the extraction conditions instead of unused (Y in Step S140), the invitee list generation unit 121 executes an extraction process 1 of extracting a user according to an extracted attribute of a device (Step S150).

In a case where no designation is designated in the service of the extraction conditions (N in Step S120), the invitee list generation unit 121 extracts all registered services corresponding to a tenant with reference to the tenant information shown in FIG. 2 (Step S160). In a case where a manager affiliated with the tenant "tnnnt-001" is logged in the service system, the invitee list generation unit 121 extracts "svc001", "svc002", and "svc003" according to the setting example of the tenant information shown in FIG. 2. Next, the invitee list generation unit 121 executes an extraction process 2 of extracting a user who is yet to use the extracted services (Step S170).

Figure 10:
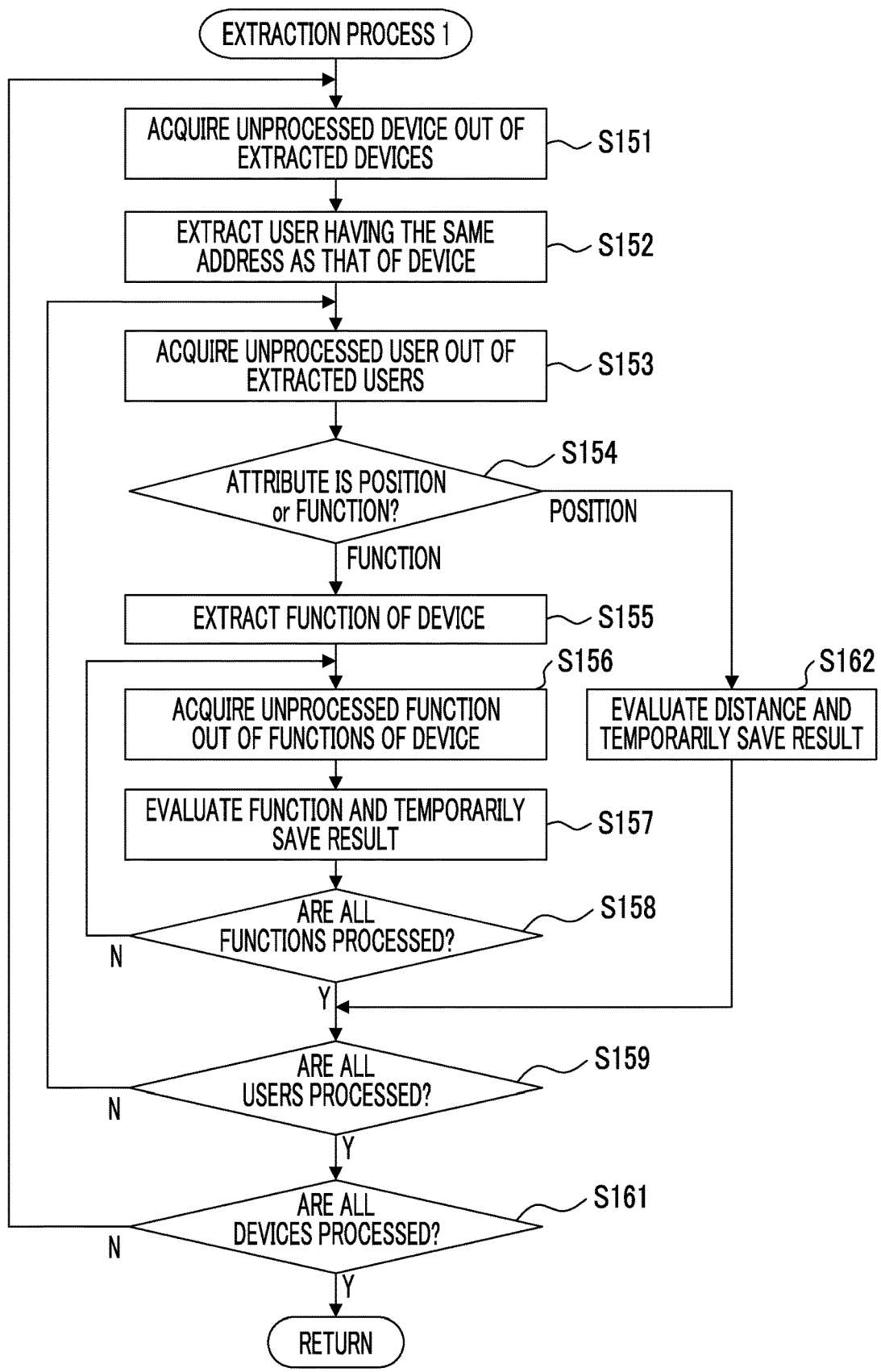
FIG. 10 is a flow chart showing an extraction process 1 shown in FIG. 9.

Herein, the extraction process 1 executed in a case where a service and an attribute are specifically designated in the extraction conditions will be described with reference to a flow chart shown in FIG. 10.

First, the invitee list generation unit 121 acquires an unprocessed device, on which a process to be described later is not carried out, out of the devices extracted in Step S130 (Step S151). Then, the invitee list generation unit 121 extracts a user having the same address as that of the acquired device with reference to device information, user information, and position information (Step S152). To describe further details, the address of the device is acquired by searching position information based on a position ID set for the position of the acquired device since device information and position information are associated with a position ID. A user, for whom a position ID having the same address as the acquired address is set, is extracted since also user information and position information are associated with a position ID.

In a case where the device is a mobile device, the position of the mobile device is not fixed. Therefore, it is necessary to acquire an address and a position of a current time point by making an enquiry to the mobile device each time in a case of referring to information of a position. Since the mobile device has a GPS function, it is possible to acquire longitude and latitude information. An address or a floor may be specified by making an enquiry to the owner of the mobile device.

Next, the invitee list generation unit 121 acquires an unprocessed user, on whom a process to be described later is not carried out, out of extracted users (Step S153). As illustrated in FIG. 12B, in a case where a position is designated in the attribute of the extraction conditions ("position" in Step S154), the invitee list generation unit 121 evaluates a distance between a device and a user by using a predetermined evaluation expression shown in FIG. 13.

FIG. 13 shows an evaluation expression set for each attribute. A distance between the position of a device and the position of a user is acquired by plugging respective pieces of coordinate information of the device and the user, which are included in position information, into pos1 and pos2 in the position evaluation expression. In a case where a distance between the device and the user is evaluated in such a manner, the invitee list generation unit 121 temporarily saves the evaluation results (Step S162).

In a case where a function is designated in the attribute of the extraction conditions ("function" in Step S154), the invitee list generation unit 121 extracts a function of the device with reference to the device information shown in FIG. 4 (Step S155). By referring to the item of function history, a function, specifically the scanning function can be extracted from the device information shown in FIG. 4. Then, an unprocessed function is acquired out of extracted functions (Step S156), and the function of the device is evaluated by using a function evaluation expression shown in FIG. 13. A device ID of the device, which is a processing target acquired in Step S151, is designated as a device ID of the function evaluation expression, the function acquired in Step S156 is designated as a function, and a user ID of the user acquired in Step S153 is designated as a user ID. In addition, in a case of evaluating a function, usage history information corresponding to the function (log file) is searched. A period (range of date and time), which is a search target, is designated as a period. For example, a fixed length of period, such as within six months from the present, may be set in advance as the period, or the manager may be caused to designate a period on the setting screen of FIG. 12A. In a case where a relationship between a device, a function, and a user is evaluated in such a manner, the invitee list generation unit 121 temporarily saves the evaluation results (Step S157).

The process described hereinbefore is performed also on other functions with respect to a pair of a device and a user (N in Step S158), is performed also on other users with respect to a device (N in Step S159), and is performed also on all devices corresponding to a service (N in Step S161). Then, in a case where all combinations are completed (Y in Steps S158, S159, and S161), processing returns to the process shown in FIG. 9.

Figure 11:
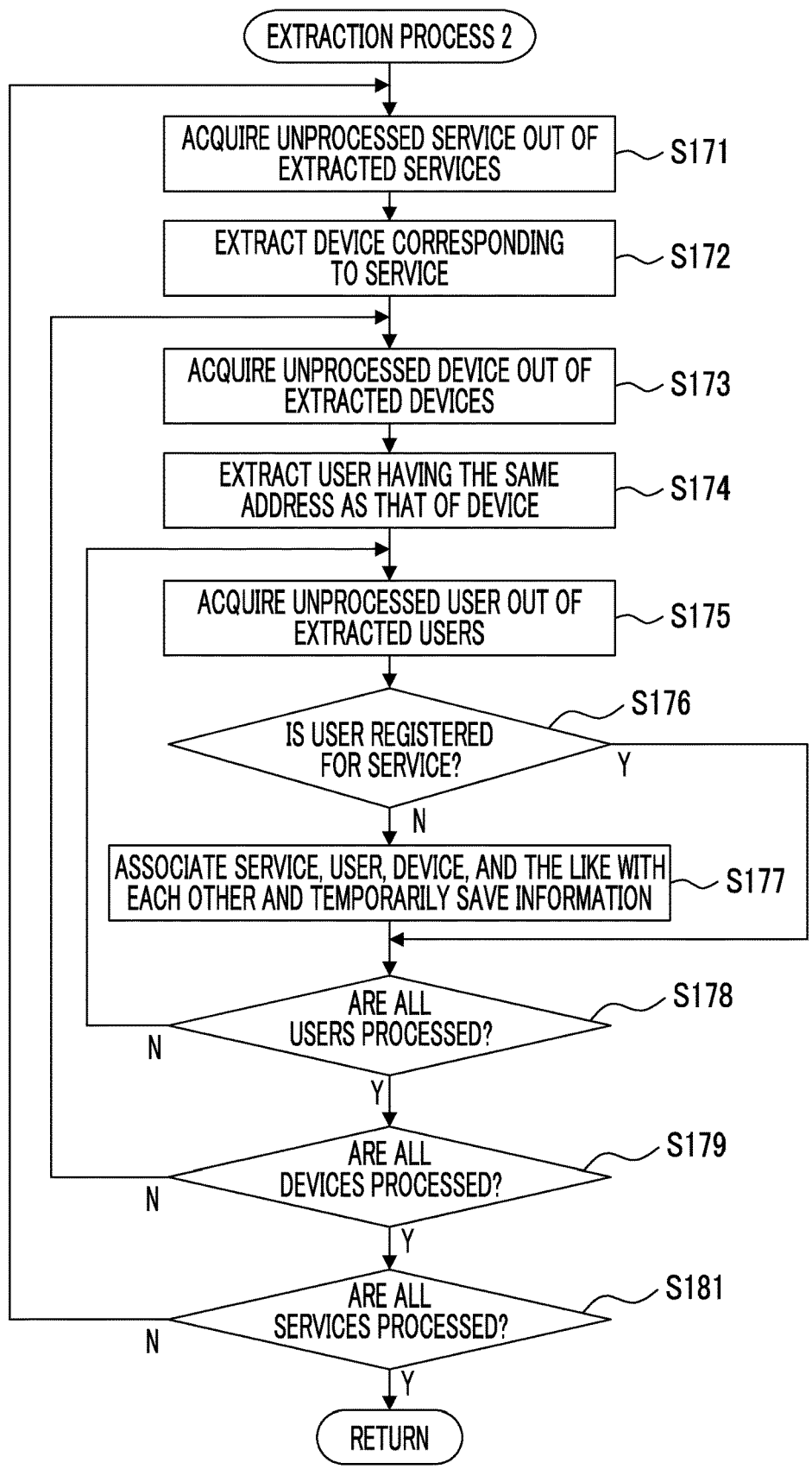
FIG. 11 is a flow chart showing an extraction process 2 shown in FIG. 9.

Next, the extraction process 2 executed in a case where a service is specifically designated in the extraction conditions will be described with reference to a flow chart shown in FIG. 11.

First, the invitee list generation unit 121 acquires an unprocessed service, on which a process to be described later is not carried out, out of services extracted in Step S160 (Step S171). Then, the invitee list generation unit 121 extracts a device corresponding to the acquired service with reference to the service information shown in FIG. 3 (Step S172). Consequently, an unprocessed device, on which a process to be described later is not carried out, is acquired out of the extracted devices (Step S173).

Next, the invitee list generation unit 121 extracts a user having the same address as that of the acquired device with reference to device information, user information, and position information as in Step S152 described above (Step S174). Next, the invitee list generation unit 121 acquires an unprocessed user, on whom a process to be described later is not carried out, out of extracted users (Step S175).

The invitee list generation unit 121 checks whether or not the service acquired in Step S171 is already registered as an available service for the user with reference to the item of available service in the user information shown in FIG. 6. In a case where the service is yet to be registered (N in Step S176), the invitee list generation unit 121 associates respective pieces of information including the service acquired in Step S171, the device acquired in Step S173, and the user acquired in Step S175, with each other and temporarily saves the information (Step S177). Specific information will be described later. In a case where the service is already registered (Y in Step S176), the invitee list generation unit 121 determines that the user is already registered for the service and does not save the information.

The process described hereinbefore is performed also on other users with respect to a pair of a service and a device (N in Step S178), is performed also on other devices with respect to a service (N in Step S179), and is performed also on all services corresponding to a tenant (N in Step S181). Then, in a case where all combinations are completed (Y in Steps S178, S179, and S181), processing returns to the process shown in FIG. 9.

As a result of executing the extraction process 1 or the extraction process 2, the invitee list generation unit 121 generates invitation information based on specifically the information temporarily saved in Step S157, Step S162, or Step S177 and saves the invitation information in the invitation information memory unit 27 (Step S180).

FIGS. 14 and 15 are tables showing a data configuration example of invitation information generated in the extraction process 1. In particular, FIG. 14 shows an example of invitation information when "svc001" is designated in the service name and "position" is designated in the attribute as extraction conditions. FIG. 15 shows an example of invitation information when "svc002" is designated in the service name and "function" is designated in the attribute as extraction conditions. Since a list of users, to whom using a service is recommended, is included in the invitation information, the invitation information corresponds to an invitee list generated by the invitee list generation unit 121.

The invitation information includes respective items such as a service name, an operation, a user name, a mail address, the nearest device, and a device position. The service name is the name of a service to which a user is intended to be invited. The operation indicates that a user is selected as a target of invitation. The name of a user, who is a target of invitation, is set in the user name, and the mail address of the user is set in the mail address. The device ID of a device, which is at the closest position to the position of the user in a case where the user uses the service, is set in the nearest device. The position (floor of position information) of the nearest device is set in the device position. Although the position of the nearest device is set in the device position herein, all devices within a predetermined distance from a user may be set. That is, since the invitation information is a list of users intended to be invited for using a service, the invitation information is generated with a user serving as reference. However, in a case where a device serves as reference, a user located within a predetermined distance from a device may be extracted as a candidate of a user to be invited for using a service.

In a case where "position" is designated in the attribute as an extraction condition, an item indicating a distance between a user and a device is added as shown in FIG. 14. Out of distances temporarily saved in Step S162, a distance between the user and the nearest device to the user is set in the item.

In a case where "function" is designated in the attribute as an extraction condition, evaluation results of Step S157 are set for each function as shown in FIG. 15. Scanning and printing are given as examples of a function in the exemplary embodiment. However, in a case of scanning, an example in which the number of times of scanning executed in a designated period (for example, within the last six months) in a case where evaluation is carried out with the use of the evaluation expression (scanning frequency) is obtained as an indicator for evaluation is given. The invitee list is sorted by scanning frequency in descending order. In a case of printing, an example in which the number of sheets printed in the period is obtained as an indicator for evaluation is given. The indicators used in evaluating respective functions are merely examples. Instead of the indicators, other indicators may be used. For example, in a case of printing, the number of times of printing may be an indicator instead of the number of sheets, or one indicator for evaluation may be calculated by weighting and combining a plurality of indicators. An indicator used in evaluating each function depends on the evaluation expression shown in FIG. 13. There are blank records in the item of operation in FIG. 15, and the reason will be described later.

FIG. 16 is a table showing a data configuration example of invitation information generated in the extraction process 2. The invitation information includes respective items such as a device and a distance to a device in addition to the service name, the operation, the user name, and the mail address which are described above. In particular, a device ID of a device to be used in the service is set in the device. A distance between a user and the device is set in the distance to a device. The distance is calculated with the use of a distance evaluation expression shown in FIG. 13.

In this way, in a case where results of extracting a user intended to be invited for using a service (invitation information) are generated in accordance with extraction conditions designated by the manager, the user to be invited confirmation unit 122 associates an invitation information file with a URL (Step S190), and transmits the associated file to the manager terminal 35 in order to display the URL onto the setting screen as a URL for download (Step S200).

After a user extraction request is transmitted by the manager selecting the extraction button, the manager terminal 35 stands by for processing results by the service system described above. In a case where a URL for download is received from the service system (Step S340), a text string of "download extraction results" is linked to the URL for download and is displayed onto the setting screen as illustrated in FIG. 12C. In a case where the manager selects the text string, the user to be invited selection unit 352 acquires an invitation information file by downloading the file from the service system, and displays onto the screen (Step S350). Any invitation information (invitee list) of FIGS. 14 to 16 corresponding to designated extraction conditions is displayed onto the screen. The manager checks a pair of a service and a user, who is a candidate to be invited for using the service, by referring to the invitation information displayed on the screen. The invitation information is displayed onto the screen such that invitation information can be edited. Therefore, in a case where user whom the manager does not want to invite is included in an invitee list, the manager may delete a record corresponding to the user. In addition, a user may be added. It is evident that the invitee list prepared by the service system may be edited as necessary. In addition, not only a user but also other item data such as a mail address may be edited.

In addition, although a record, in which "invitation" is not set in the item of operation included in FIG. 15, is included in the invitee list, scanning frequency does not satisfy a predetermined threshold, that is, the frequency of use of the scanning function by a user is low. Therefore, the record is a record related to a user who has not been an invitation candidate. In other words, a user for whom "invitation" is not set does not become a target of invitation since the function (scanning function in the exemplary embodiment) is used less than a predetermined threshold in a predetermined period. Therefore, in a case of making a user corresponding to the record, in which "invitation" is not set in the item of operation, a target of invitation, the manager sets "invitation" in the item of operation of the corresponding record.

In this way, an invitee is selected by the manager editing invitation information displayed on the screen as necessary. The user to be invited selection unit 352 receives the edited invitation information file and saves the invitation information file in a predetermined storage destination (Step S360). As shown in FIG. 12D, the name of the invitation information file is displayed as an upload target file in a predetermined display region 42 of the setting screen.

In a case where the manager selects an "execute collective setting" button 43, the user to be invited selection unit 352 transmits the invitation information file, which is an upload target, to the service system (Step S370). In such a manner, the manager explicitly instructs to invite a user. The manager can select a reference button 44, and select an upload target file as appropriate.

By receiving the invitation information file transmitted from the manager terminal 35 (Step S210), the user to be invited confirmation unit 122 in the service system confirms a user to become a target of invitation for using a service. Since a mail address is set in the invitation information as shown in FIGS. 14 to 16, the notifying unit 123 reads an invitation message corresponding to the service with reference to the service information shown in FIG. 3, sets the invitation message as a body of an electronic mail, and transmits the invitation message with the mail address as a destination (Step S220).

The manager checks the content of an invitee list before transmitting an invitation message to a person in question as described above in the exemplary embodiment. However, Steps S340 to S370 and Steps S190 to S210 may be omitted, and in a case where the service system generates invitation information, the invitation message may be transmitted to a corresponding user in accordance with the invitation information without the manager checking and editing an invitation list.

FIG. 17 is a table showing a data setting example of user information subsequent to a response made on whether or not each user has accepted the invitation after transmitting an invitation message to the corresponding user based on the invitation information shown in FIGS. 14 and 15. According to the invitation information shown in FIG. 14, although an invitation message is transmitted to six users, "kanazawa" and "tanaka" have accepted the invitation for using the service "svc001", out of the six users, but other users have rejected the invitation. According to the invitation information shown in FIG. 15, an invitation message is transmitted to three users, and all users to which the invitation message is transmitted have accepted the invitation for using the service "svc002".

As described above, since a user who satisfies extraction conditions designated by the manager is extracted based on a device to be used in providing a service, the past device of a user, or a usage record of a function, a user appropriate to be invited for using a service can be automatically extracted in the exemplary embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor, configured to:
extract a candidate user to be invited to the service, based on attribute information of an object necessary for using a service provided by a service system and information related to the candidate user out of users of the object who have yet to use the service,
wherein the processor extracts the candidate user to be invited to the service based on a function provided by the object necessary for using the service and a usage history of the function by the candidate user,
wherein the processor extracts a user who has used the function provided by the object for over a predetermined number of times within a predetermined period as the candidate user to be invited to the service,
wherein the function is available for the candidate user before the candidate user is invited to the service related to the function, and
wherein the processor causes a manager to either select the extracted candidate user to invite to the service or not to select the extracted candidate user to invite to the service.

2. The information processing apparatus according to claim 1,
wherein in a case where a position is designated as an extraction condition, the processor extracts the candidate user to be invited to the service further based on a positional relationship between the object necessary for using the service and the candidate user.

3. The information processing apparatus according to claim 2,
wherein the processor extracts a user located within a predetermined distance from the object necessary for using the service as the candidate for the user invited to the service, who is a processing target.

4. The information processing apparatus according to claim 1,
wherein the object is a device.

5. The information processing apparatus according to claim 2,
wherein the object is a device.

6. The information processing apparatus according to claim 3,
wherein the object is a device.

7. A non-transitory computer readable medium storing a program causing a computer to:
extract a candidate user to be invited to the service, based on attribute information of an object necessary for using a service provided by a service system and information related to the candidate user out of users of the object who have yet to use the service,
wherein the candidate user to be invited to the service is extracted based on a function provided by the object necessary for using the service and a usage history of the function by the candidate user,
wherein a user who has used the function provided by the object for over a predetermined number of times within a predetermined period is extracted as the candidate user to be invited to the service,
wherein the function is available for the candidate user before the candidate user is invited to the service related to the function, and
wherein a manager is caused to either select the extracted candidate to invite to the service or not to select the extracted candidate user to invite to the service.

8. An information processing apparatus comprising:
a processor, configured to:
extract a candidate user to be invited to the service, based on attribute information of an object necessary for using a service provided by a service system and information related to the candidate user out of users of the object who have yet to use the service, wherein the attribute information is history usage information of the candidate user using the object and position information of the candidate user with respect to the object; and
transmit an invitation to invite the extracted candidate user to the service,
wherein the object is a multi-function printer.

* * * * *